United States Patent

Harris et al.

[15] 3,701,279
[45] Oct. 31, 1972

[54] AIRCRAFT WEIGHT AND CENTER OF GRAVITY INDICATOR SYSTEM

[72] Inventors: Carl R. Harris, Kirkland; Robert B. Banks, Bellevue; Dallas V. Soward, Seattle, all of Wash.

[73] Assignee: Electro Development Corporation, Lynnwood, Wash.

[22] Filed: Feb. 8, 1971

[21] Appl. No.: 113,129

[52] U.S. Cl. .................................. 73/65, 177/136
[51] Int. Cl. .......................................... G01m 1/12
[58] Field of Search ......................... 73/65; 177/136

[56] References Cited

UNITED STATES PATENTS

| | | | |
|---|---|---|---|
| 3,584,503 | 6/1971 | Senour | 73/65 |
| 2,559,718 | 7/1951 | Goodlett et al. | 73/65 |
| 2,686,634 | 8/1954 | Kolisch | 73/65 X |

OTHER PUBLICATIONS

B. J. Hawkins, " STAN–for Aircraft Take–off Weight & Balance," Inst. & Control Systems, Feb. 1965, pp. 89–93

*Primary Examiner*—Charles A. Ruehl
*Attorney*—Christensen & Sanborn

[57] ABSTRACT

After a discussion of the prior art techniques and apparatus for insuring that an aircraft is loaded correctly, such as loading charts, manifest forms, tipping alarms, and the like, an improved weight and balance system for aircraft is described for providing automated monitoring of aircraft loading. The system includes a plurality of transducers generating signals proportional to the forces acting on the landing gear of the aircraft. These signals are summed to obtain a signal proportional to the instantaneous gross weight of the aircraft. In addition, an analog computer derives from these signals a signal which is proportional to the aircraft's instantaneous center of gravity moment. A display means provides for the continuous display of gross weight and center of gravity, in terms of percent MAC. In addition, the gross weight signal is applied to first and second function generators which develop therefrom signals corresponding to forward and aft center of gravity limits. Comparison is made in appropriate circuitry of the instantaneous center of gravity moment with the forward and aft CG limits, and an appropriate indication is made if either limit is exceeded during loading. An embodiment of the function generators and comparators is described in detail. A modification of the system to compensate for effects of fuel withdrawal upon center of gravity during flight is also described.

8 Claims, 6 Drawing Figures

PATENTED OCT 31 1972 3,701,279

INVENTORS
CARL R. HARRIS
ROBERT B. BANKS
BY  DALLAS V. SOWARD

Christensen & Sanborn
ATTORNEYS

AIRCRAFT WEIGHT AND CENTER OF GRAVITY INDICATOR SYSTEM

FIELD OF THE INVENTION

This invention generally relates to aircraft weight and balance systems, and, more particularly, to such a system for determining whether an aircraft has been loaded in accordance with acceptable, safe limits of the center of gravity thereof.

BACKGROUND OF THE INVENTION

Certain considerations of safety and flying trim of an aircraft dictate that the center of gravity thereof be kept within acceptable forward and aft limits along a longitudinal line passing through the aircraft's fuselage. In extreme cases, if the center of gravity shifts past an acceptable aft limit thereof, the aircraft may tip backwards while on the ground by rotating about its main landing gear. Likewise, if the center of gravity shifts past an acceptable forward limit thereof, it may be difficult to place the aircraft in an airborne condition. In less extreme cases, the flying trim of the aircraft is nevertheless severely affected.

Recognizing these problems, the airline companies, in conjunction with aircraft manufacturers, have prepared loading charts which are used by loading personnel at the airline terminals in an attempt to maintain the aircraft's center of gravity within acceptable limits by the proper distribution of cargo. In order to use these charts, the cargo master must weigh or estimate the weight of each item of cargo and, by manual and graphical computations, determine where each item should be placed.

These loading charts have a number of significant disadvantages. First, their use is time-consuming, to an extent such that the time that the aircraft can be used in productive flying activity is limited. As many as 4 man hours may be spent before each flight using the charts. Attempts are now being made to increase the utilization of aircraft because of the more costly investment involved therein. For example, it is desirable that the generation of wide-bodied jets be able to discharge passengers and unload cargo, and to load passengers or cargo for takeoff in a turnaround time less than 30 minutes. The time presently required for the use of loading charts is a significant factor in turnaround time.

Second, many of the assumptions upon which these loading charts are based cannot be made with wide-bodied aircraft. For example, the error that results from estimating the weight of some items of cargo, and from estimating the weight of passengers and their baggage, in approximating the center of gravity is multiplied over that experienced with previous aircraft, due to the much greater capacity of the wide-bodied jets. This greater error makes it imperative that a wider margin of tolerance be given in the determination of forward and aft center of gravity limits. A direct result of this increased tolerance is a reduction in the payload that each aircraft can carry.

In addition, the loading charts incorporate a variable proportional to normal seating variation by passengers. It has not been the airlines' practice to place restrictions on where passengers may sit. Therefore, the maximum undesirable effect on the forward and aft center of gravity limits must be incorporated in the margin of tolerance of the loading charts. Again, seating variation effects a reduction in the payload of the aircraft.

In aircraft carrying both passengers and cargo, it has been possible, because of the relatively small size of the cargo compartments, to consider that the cargo is centrally located therein. However, with the wide-bodied jets and their larger cargo compartments, this assumption may not be correct and any difference between an assumed center of gravity of the cargo and its actual center of gravity may be significant.

Therefore, the use of loading charts with wide-bodied jets not only reduces the payload that can be carried, but also increases the possibility of misloading and resultant hazardous flying trim.

Because of safety considerations, government agencies, such as the FAA, require that personnel other than the loading crew complete a number of "manifest" forms to indicate that the aircraft has been properly loaded. This work is typically done after the aircraft has departed and involves calculation of the aircraft's center of gravity, its gross weight, and a detailed comparison of the loading configuration with an appropriate loading chart. The procedure involved typically consumes 20 to 30 man hours per flight, not including computer time. Although the manifest forms are of little value to ascertain correct loading before the aircraft departs, they are of value in determining whether or not the load plan was correct if an accident does occur. Again, this procedure is time consuming and as it involves a reconstruction of the center of gravity and gross weight from certain assumptions, it is subject to error.

In response to these problems, there has been developed weight and balance systems which indicate the instantaneous gross weight and center of gravity of the aircraft. These systems have been extremely helpful in eliminating errors in both the estimation of center of gravity obtained by loading personnel, and in the reconstruction of the center of gravity for the aforesaid manifest forms. However, they have not been sufficiently sophisticated to allow the airlines to dispense with loading charts. Perhaps the primary reason has been that the acceptable forward and aft loading limits for center of gravity may vary as a function of the aircraft's gross weight. Hitherto, there has been no way to ascertain at the time of loading whether or not the limits were being exceeded, because of the simultaneous variation in gross weight. At best, the center of gravity and gross weight values would have to be continuously compared with the aforesaid loading charts. This operation is obviously cumbersome. In addition, the uncertainties in its implementation require that tolerance be made for human error, which tolerance directly reduces the aircraft's payload. Also, these systems cannot effect a significant reduction in time consumed in preparing the aforesaid manifest forms.

An improvement for weight and balance systems has been an indicator which triggered a tipping alarm to indicate that, upon loading, the aircraft was loaded too heavily in the aft section and was about to topple backwards. Although this automated system does reduce the time involved in loading, the criteria for its operation includes an extreme situation which is obviously dangerous, but which has little relevance to other factors embodied in the aft center of gravity limit, such as flying trim. In addition, there is no provision in this system for detecting or indicating when the aircraft's center of gravity has passed an acceptable forward limit thereof.

It is therefore an object of this invention to provide a weight and balance system which displays the instantaneous value of the aircraft's gross weight and center of gravity.

It is a further object of this invention to provide such a display of gross weight and center of gravity whose accuracy can be certified to appropriate government agencies in conjunction with or in place of the presently-used manifest forms.

It is another object of this invention to provide such a system which compares the aircraft's instantaneous center of gravity with predetermined forward and aft limits thereof, and which furnishes output indications whenever the center of gravity equals or exceeds these limits.

It is yet another object of this invention to provide such a system which is located on-board the aircraft, and which can provide the aforementioned indications in a manner suitable for use by loading personnel.

It is a still further object of this invention to provide a system whose accuracy is sufficient to certify to appropriate government agencies that the aircraft has been properly loaded before flight.

It is yet a further object of this invention to provide such a system in which the computations of center of gravity and gross weight are compensated for by factors proportional to the aircraft's fuel weight and fuel center of gravity.

SUMMARY OF THE INVENTION

These objects and others are achieved, briefly, by means providing a plurality of signals, each signal being proportional to a force exerted on a landing gear of the aircraft, means computing the aircraft's actual center of gravity from said plurality of signals, and means computing the aircraft's gross weight from said plurality of signals, and means comparing said actual center of gravity with a predetermined envelope of desired values thereof, some of which are dependent on the aircraft's gross weight, and providing an output signal when said actual center of gravity does not correspond to said envelope.

BRIEF DESCRIPTION OF THE DRAWINGS

For a complete understanding of the invention, together with further objects and advantages thereof, reference should be made to the following portion of the specification, taken in conjunction with the accompanying drawings in which.

DESCRIPTION OF A PREFERRED EMBODIMENT

Figure 1:
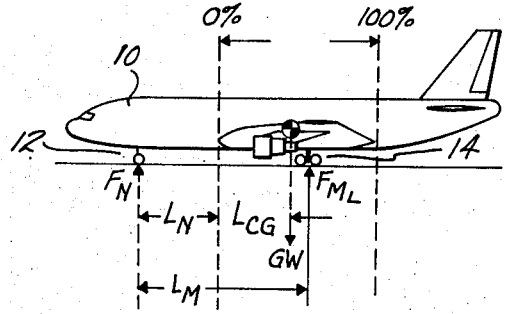
FIG. 1 is a pictorial diagram illustrating the forces and dimensions from which the aircraft's gross weight and center of gravity are computed.

The terminology used in defining the forces and dimensions useful in computing the aircraft's center of gravity and gross weight is seen in FIG. 1. Specifically, an aircraft 10 has a front or nose landing gear 12 and a pair of rear or main landing gears 14. When the aircraft 10 is on the ground, a force $F_N$ is exerted on the nose landing gear 12, and forces $F_{ML}$ and forces $F_{MR}$ on the left and right main landing gears 14, respectively. The gross weight GW, which acts through the aircraft's center of gravity CG, acts in a direction opposite to the forces exerted on the landing gears 12, 14 and is equal to the sum thereof such that $$GW = F_N + F_{ML} + F_{MR} \quad (1)$$

The center of gravity CG, viewed along an axis extending in the longitudinal direction of the fuselage, can be defined as $$CG = (W_1 X_1 + W_2 X_2 + \ldots W_N X_N)/(w_1 + W_2 + \ldots W_N) \quad (2)$$

where $W_1, W_N$ = the individual weights of the aircraft components, and $X_1, \ldots X_N$ = the distances from the center of gravity of the components to a fixed reference.

Equation (2) indicates that the center of gravity is thus equal to the sum of the center of gravity moments with respect to the fixed reference, divided by the gross weight of the aircraft. Since all the weight of the aircraft must act through the landing gears 12, 14 when the aircraft is in ground contact, the sum of the center of gravity moments may be found by computing the moments of the forces $F_N$, $F_{MR}$, with respect to a fixed reference.

Again referring to FIG. 1, the mean aerodynamic chord, or MAC, extends in a direction parallel to the aforementioned longitudinal axis of the aircraft 10 and is represented in terms of a percentage thereof. The fixed reference for the computation of center of gravity moments is conveniently chosen to be the leading edge of the MAC, or 0 percent MAC. Since the GW is known, the location of the center of gravity, or $L_{CG}$ with reference to the leading edge of MAC, can be computed by summing the moments of the forces in FIG. 1 about 0 percent MAC. Thus, $$L_N F_N + L_{CG} GW - 2 \times F_M (L_M - L_N) = 0, \quad (3)$$

where $L_N$ = the moment arm of $F_N$ and $L_M$ = distance between $L_M$ and $F_N$. In this computation it is assumed that $F_{ML} = F_{MR}$, although the circuitry to be described compensates for any difference therebetween by taking the moment of each force.

By suitable rearrangement of equation (3) it can be shown that $$L_{CG} = 2F_M L_M - L_N GW)/(GW) \quad (4)$$

By implementing equation (4) with suitable analog circuitry, the instantaneous value of the aircraft's center of gravity CG can be determined. Of course, it would be obvious to one skilled in the art that other moments could be taken about a different reference in order to determine the center of gravity CG.

As it will be seen hereinafter, the forward and aft limits for the center of gravity CG are typically expressed in terms of a percentage of MAC, and in such cases the center of gravity CG is also expressed in terms of a percentage of MAC by the following equation:

$$L_{CG} = (2F_M L_M - L_N GW)/(GW) \times 100\% /MAC \quad (5)$$

Figure 2:
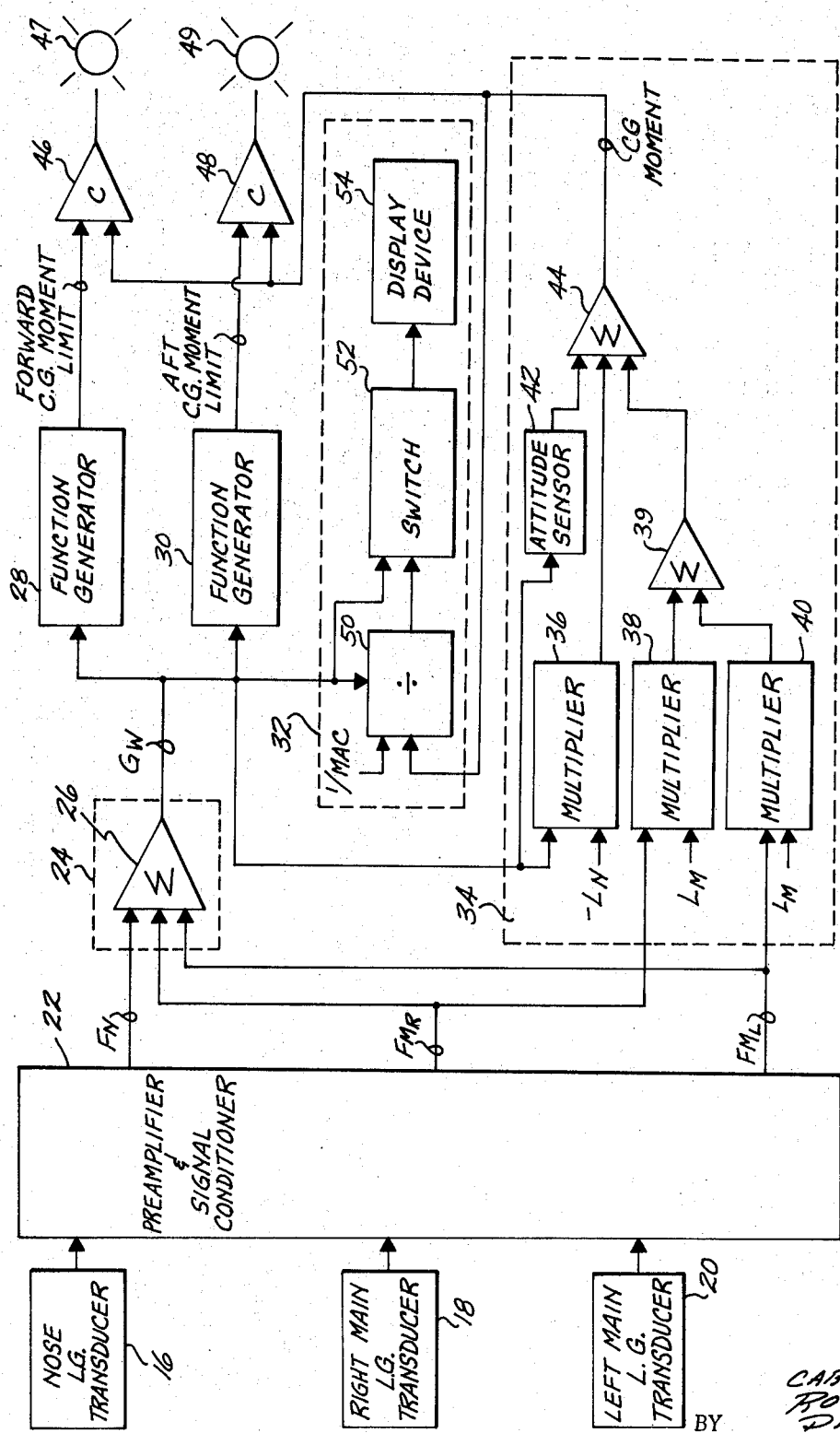
FIG. 2 is a block diagram of one embodiment of the invention.

With particular reference to FIG. 2, a plurality of transducers 16, 18 and 20 are provided for sensing the forces $F_N$, $F_{MR}$ and $F_{ML}$, respectively, which are exerted on the nose landing gear 12 and main landing gears 14. The transducers 16, 18 and 20 may be of any type which provides an output signal proportional to the force exerted on an associated landing gear of the aircraft, which force represents the portion of the aircraft's weight acting through that landing gear. Various transducer arrangements have been proposed which measure aircraft weight as a function of deformation of the landing gear's axle, or as a function of axle bending. However, it is preferred that these transducers be embodied in devices which measure the shear deflection of the landing gear axle. Such transducer arrangements are of two types. In the first case, the transducers are disposed inside the axle, as more completely shown in U.S. Pat. No. 3,521,484, Dybvad et al, which is assigned to the assignee of the present invention. In the second case, the transducers are mounted on lugs on the outside of the axle, as more completely shown in U.S. Pat. No. 3,464,259, Farr, which is also assigned to the asignee of the present invention.

The output signal from each of the transducers 16, 18 and 20 is on the order of a few millivolts, and must be further amplified for use by the ensuing analog circuitry of the system. To this end, a preamplifier and signal conditioner 22 is provided which functions not only to perform the aforesaid amplification, but also to normalize the transducer signals by the introduction of suitable scaling factors so that the output signals therefrom are truly proportional to the weight force acting through the associated landing gear. If desired, the circuit 22 may also modify the signals from the transducers by a factor proportional to the actual value of the power supply voltage for the system. This factor is known as the system reference and is likewise applied to each other signal in the system so that the effects of power supply voltage variation upon system accuracy are eliminated.

The signals $F_N$, $F_{MR}$ and $F_{ML}$ are fed to a gross weight calculator 24 which may comprise a simple operational amplifier 26 connected for operation in a summing mode. The output signal from operational amplifier 26 therefore represents the instantaneous gross weight GW of the aircraft 10.

The gross weight signal GW and the signals $F_{MR}$, $F_{ML}$ are fed to a center-of-gravity moment computer 34 which includes analog circuitry implementing a part of Equation (4) above to provide an output signal which is proportional to the sum of the center of gravity moments about the 0 percent MAC reference. This signal is indicated in FIG. 2 as CG MOMENT.

Specifically, the GW signal is fed to a first multiplier 36 which also has supplied thereto a signal whose value is proportional to $-L_N$. The output signal from multiplier 36 is thus proportional to $-L_N$ GW and is fed to one input of a summing operational amplifier 44. The $F_{MR}$ signal is coupled to one input of a similar multiplier 38 whose other input is furnished with a signal whose value is proportional to LM. The output signal from multiplier 38 is thus proportional to $F_{MR} L_M$ and is coupled to one input of a summing operational amplifier 39. The signal $F_{ML}$ is coupled to one input of a third multiplier 40 whose other input is provided with a signal whose value is proportional to $L_M$. The output signal from multiplier 40 is thus proportional to $F_{ML} L_M$ and is coupled to the other input of summing amplifier 39. The output of summing amplifier 39 is then coupled to a second input of summing amplifier 44.

The output signal from summing amplifier 44 represents a quantity equal to the numerator of equation (4) and is supplied to a display means 32 and comparators 46 and 48 as the CG MOMENT signal.

Since the dimensions $L_N$ and $L_M$ are constant for any given aircraft, the multipliers 36, 38 and 40 may, in one embodiment, comprises simple resistive networks modifying the GW and $F_M$ signals by scaling factors proportional to the aforesaid dimensions. In another embodiment, the multipliers 36, 38 and 40 could comprise operational amplifiers whose gain is regulated at $L_N$ and $L_M$, respectively.

An apparent shift in the center of gravity moment occurs when the runway on which the aircraft is resting is tilted in a direction parallel to the MAC. This error results from the fact that the transducers 16, 18 and 20 measure the force acting through each landing gear. When tilt is encountered, however, summing moments about 0 percent MAC from the sensor locations on the landing gears provides an apparent center of gravity along a line drawn through the sensors which is shifted with respect to the real center of gravity occurring along a line passing through the aircraft's fuselage. A 3° tilt from the vertical may shift the indicated location of the center of gravity as much as 8 inches. To compensate for this shift, the GW signal is also fed to an attitude sensor 42 within the computer 34. Attitude sensor 42 is mechanically coupled through the aircraft's structure to the main landing gears. It has been found that the most significant tilt to be encountered is that occurring at the main landing gears, and that a correction factor to be applied to compensate for this tilt is also a function of gross weight. Therefore, attitude sensor 42 provides an output signal which compensates for the apparent shift in center of gravity moment location by summation with the remaining signals in summing amplifier 44.

For display purposes, the CG MOMENT signal and the GW signal are supplied to an analog circuit 50 within display means 32. Circuit 50 also receives as an input a signal whose value is proportional to 1/MAC. The operation of circuit 50 is such that the output signal therefrom is proportional to CG MOMENT divided by GW(MAC), or $L_{CG}$.

Both the $L_{CG}$ and GW signals are supplied in turn to a switch 52 which functions to alternately connect them, in response to manual operation, to a display device 54. An A/D converter and a digital readout device preferably are included within display device 54 so that digital indication is made of either instantaneous weight or center of gravity.

The forward and aft center of gravity limits are provided by function generators 28 and 30, respectively. In many cases, the forward or the aft limits, or both, vary with gross weight of the aircraft. In such cases, the GW signal may be supplied to function generators 28 and 30 in order to provide suitable output signals which are in turn a function of gross weight. These signals, denoted FORWARD CG MOMENT LIMIT and the AFT CG MOMENT LIMIT, have values which are proportional to a percentage of the main aerodynamic chord MAC and are supplied to the other inputs of comparators 46 and 48, respectively. If the CG MOMENT signal is less than the FORWARD CG MOMENT LIMIT signal, comparator 46 provides an output to energize an indicator lamp 47. If the CG MOMENT signal is greater than the AFT CG MOMENT LIMIT signal, comparator 48 provides an output to energize an indicator lamp 49.

The elements of FIG. 2 comprising function generators 28 and 30 and comparators 46 and 48 may be considered as an apparatus comparing the actual center of gravity represented by the CG MOMENT signal, with an envelope of acceptable values thereof. This envelope preferably is derived for each aircraft and reflects design parameters which are significant for considerations of safety and flying trim. For example, the aft CG limit may be set at the extreme embodied in the prior tipping alarm devices, such that exceeding this limit results in tipping of the aircraft in a backward direction about its main landing gear. Preferably, the aft limit is chosen in accordance with more conservative design parameters. Likewise, the forward CG limit of the envelope may be determined by the center of gravity value necessary to allow the plane to become airborne.

Figure 4:
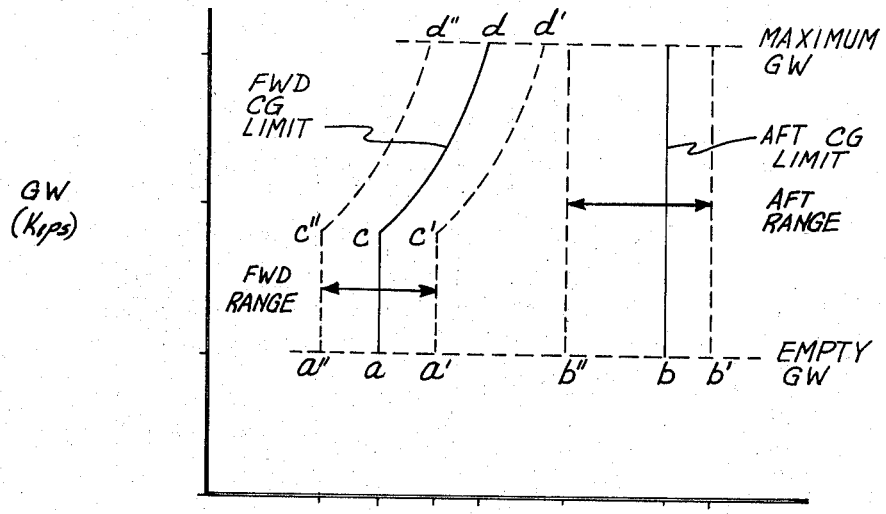
FIG. 4 is a graph illustrating a typical center of gravity envelope.

One CG design envelope that may be used is seen in FIG. 4, in which $L_{CG}$, in terms of percent of MAC, is plotted against gross weight GW. The upper and lower limits of the envelope in FIG. 4 represent the maximum allowable gross weight and the empty gross weight, respectively, of the aircraft. The right limit thereof represents the aft CG limit, and the left limit thereof represents the forward CG limit. The aft CG limit is constant and not a function of gross weight GW. Thus, the aft CG limit has a value $b$ throughout the acceptable GW range, and is adjustable to maximum and minimum values of $b'$ and $b''$, respectively.

The forward CG limit is seen to have a constant value for increases of GW from the empty gross weight, at $a$, to point $c$. From $a$ to $c$, therefore, the forward CG limit is not a function of gross weight GW. However, for increases of GW above $c$, the forward CG limit is a function of gross weight, and increases, in terms of percent MAC, to the value at $d$. As with the aft CG limit, the forward CG limit is variable within the range defined by the curves $a'$, $c'$, $d'$ and $a''$, $c''$, $d''$.

While, in one embodiment, the value of the aft CG limit can be completely determined from the CG value at which the aircraft begins to topple backward, determination of the forward CG limit is more difficult. For increases in gross weight GW from points $a$ to $c$, the forward CG limit is not a function of gross weight GW and can be related simply to a limit thereof desirable for proper flying trim of the aircraft. However, the curve from point $c$ to point $d$ is related directly to take-off conditions. To place an aircraft in an airborne condition, the pilot must first bring the aircraft to a predetermined take-off speed. When this speed is achieved, the pilot pulls back on the control wheel to rotate the plane about its main landing gear into an attitude suitable for take-off. If the aircraft cannot be thus rotated, take-off cannot be achieved.

Figure 5:
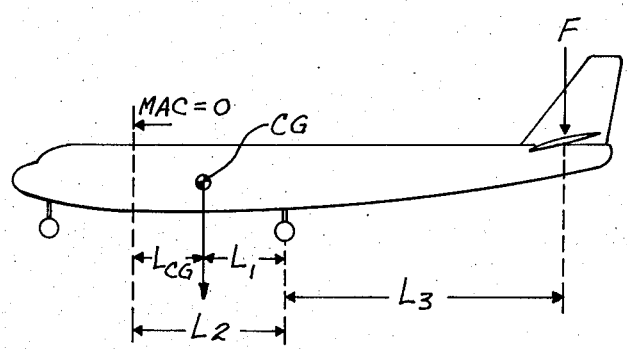
FIG. 5 is a pictorial diagram illustrating the forces and dimensions to be considered in arriving at a portion of that envelope.

With particular reference to FIG. 5, the force that is available for effecting this rotation is that acting on the aircraft's tail $F_T$, which is the result of airflow past both inclined surfaces thereof. The moment developed by the force $F_T$ with reference to the aircraft's main landing gear 14 must be equal to or larger than the moment developed by the aircraft's weight acting through its center of gravity CG. Thus, $$GWL_1 = F_T L_3, \qquad (6)$$

where $L_1$ = the distance from CG to the main landing gear 14, and $L_3$ = distance from $F_T$ to the main landing gear 14. Since $$L_1 = L_2 - L_{CG}, \qquad (7)$$

where $L_2$ = distance from 0 percent MAC to the main landing gear 14, equation (6) may be written as $$L_{CG} = L_2 - (F_T L_3)/(GW) \qquad (8)$$

Equation (8) represents the variation in the forward CG limit from point $c$ to point $d$.

While the envelope in FIG. 4 may be useful for many types of aircraft, it is to be understood that the invention is not limited to the use thereof, but rather is intended to be used with any envelope of desired center of gravity limits.

Figure 6:
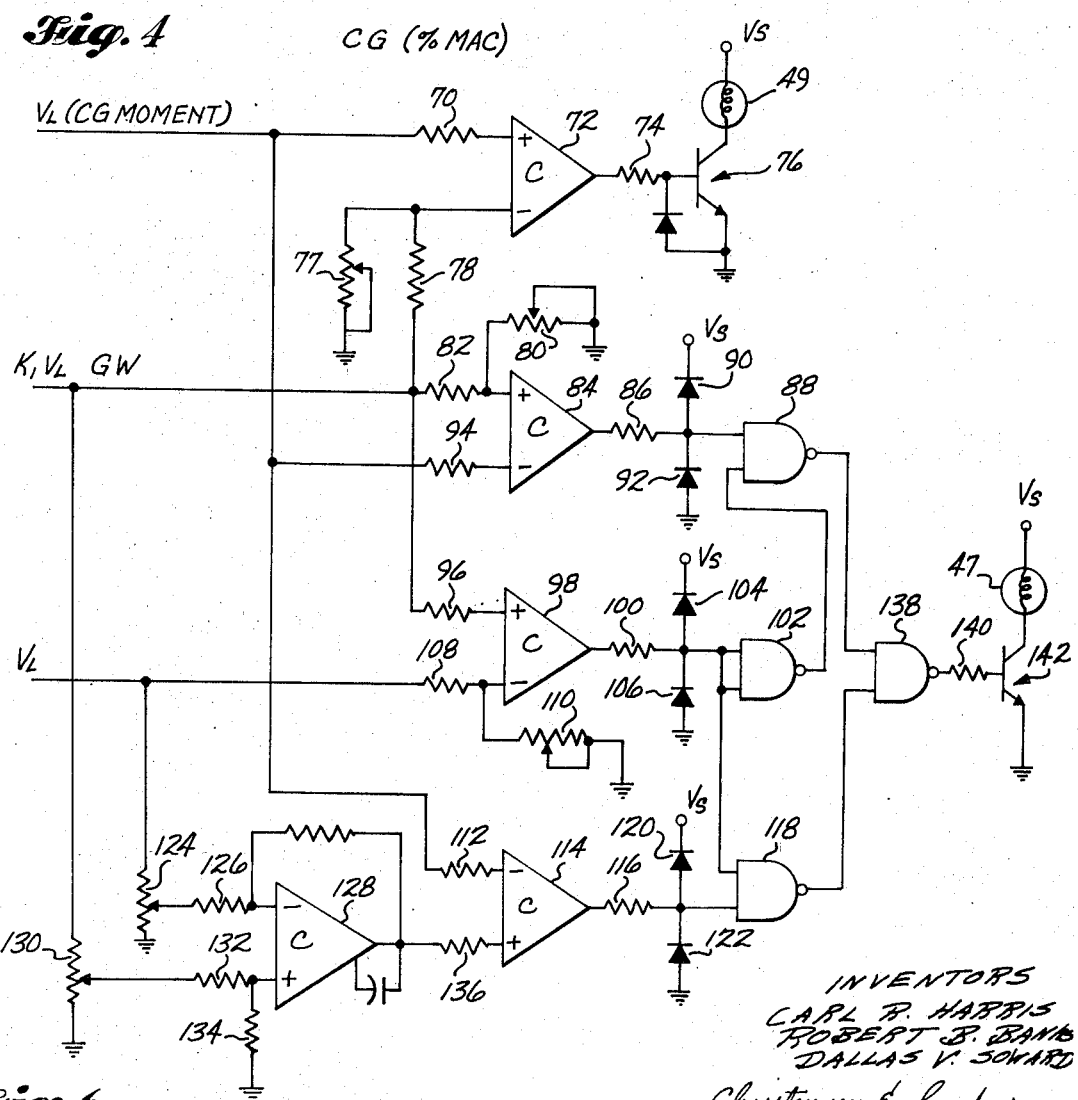
FIG. 6 is a schematic diagram of one embodiment of the function generators and comparators of FIG. 2.

One embodiment of an analog circuit for providing the envelope and comparisons of FIG. 4 is seen in FIG. 6. In order to produce the aft CG limit and a comparison of the actual CG location with that limit, the CG MOMENT signal is multiplied by a system reference $V_L$, and applied through a resistor 70 to the positive input of a comparator 72. The output of comparator 72 is coupled through a resistor 74 to a transistor driver 76. The GW signal, as multiplied by the system reference $V_L$, and a scaling constant $K_1$ is applied through a resistor 78 to the negative input of comparator 72, and a trimming variable resistor 77 is connected in shunt therewith.

Normally, the signal $V_L$ (CG MOMENT) is less than the signal $K_1 V_L GW$, and therefore the output of comparator 72 is negative. In such a case, transistor switch 76 is maintained in a non-conducting condition. However, when $V_L$ (CG MOMENT) is greater than $K_1 V_L GW$, the output thereof changes to a positive value so as to place transistor switch 76 in conducting condition. An indicating lamp 49 is then energized from a voltage supply $V_{SL}$ to ground potential.

This transition occurs when $K_1 V_L GW (K_2) = V_L GW(CG)$, (9)

where, $K_2$ = a scaling factor introduced by resistors 77 and 78, and $GW(CG)$ = CG MOMENT.

Re-writing equation (9), it can be seen that $$CG = K_1 (K_1) = b.$$

Therefore, as in FIG. 4, the aft CG limit is a constant value $b$ throughout the expected range of gross weight GW. The limit can be shifted between extremes $b'$ and $b''$ by adjustment of potentiometer 77.

To produce the forward CG limit, the $K_1 V_L GW$ signal is applied through a resistor 82 to the positive input of a comparator 84, through a potentiometer 130 and a resistor 132 to the positive input of a comparator 128, and through a resistor 96 to the positive input of a comparator 98. The $V_L$ (CG MOMENT) signal is applied through a resistor 94 to the negative input of comparator 84 and through a resistor 112 to the negative input of a comparator 114. The system reference $V_L$ is applied through a resistor 108 to the negative input of comparator 98, and through a potentiometer 124 and a resistor 126 to the negative input of comparator 128.

The output of comparator 128 is coupled to the positive input of comparator 114. In turn, the outputs of comparators 84, 98, and 114 are coupled through resistors 86, 100 and 116 to one input each of a plurality of NAND gates 88, 102 and 118. The output of comparator 98 is likewise supplied to a second input of NAND gate 102, and to a second input of NAND gate 118. The output of NAND gate 102 is supplied to a second input of NAND gate 88, and the outputs of the NAND gates 88 and 118 are supplied to the inputs of a fourth NAND gate 138. In turn, the output of NAND gate 138 is coupled by a resistor 140 to a transistor switch 142 connected in circuit with the indicator lamp 147.

The cross-over point $c$ in the forward CG limit is determined in the following fashion. Comparator 98 provides a positive output signal when the signal supplied to its positive input through resistor 96 exceeds the signal supplied to its negative input through resistor 108. This condition occurs when $$K_3K_1V_LGW=K_4V_L, \quad (11)$$

where $K_3$ = a scaling factor provided by resistor 96, and $K_4$ = a scaling factor provided by resistor 108 and potentiometer 110. Re-writing equation (11), it may be seen that the transition occurs when $$GW=(K_4)/(K_3K_1)=C. \quad (12)$$

Adjustment of the cross-over point $c$ with respect to GW can be conveniently made within a predetermined range by adjustment of potentiometer 110.

The output of comparator 98, which is clamped by diodes 104 and 106, is effectively inverted by NAND gate 102. Therefore, for values of gross weight below $c$, a logic "1" output is provided to the input of AND gate 88, and for values of gross weight above $c$, a logic "0" output is provided thereto.

Comparator 84 and its associated circuitry determine the portion of the forward CG limit from point a to point c. specifically, the comparator 84 provides a positive output when the signal at its positive input coupled through resistor 82 is greater than the signal at its negative input coupled through resistor 94. This condition occurs when $$K_6K_1V_LGW=K_5V_LV_LGW(CG), \quad (13)$$

where $K_6$ = a scaling factor introduced by resistor 82 and potentiometer 80, and $K_5$ = a scaling factor introduced by resistor 94. Rewriting equation (13), it can be seen that the transition occurs at $$CG=(K_1K_6)/(K_5a. \quad (14)$$

When the forward CG limit has been exceeded, the logic "1" output of comparator 84, which is clamped by diodes 90 and 92, and the logic "1" output from NAND gate 102, determine that NAND gate 88 provides a logic "0" output to NAND gate 138, which in turn provides a logic "0" or positive output to transistor switch 142 to energize indicator lamp 47.

When the gross weight exceeds the value C, the output transition of comparator 98 occurs so that a logic "0" signal is supplied to NAND gate 88. In turn, NAND gate 88 provides logic "1" output to NAND gate 138. Therefore, whenever the gross weight GW is above the value $c$, indicator lamp 47 cannot be energized from the circuitry including comparator 84 and NAND gate 88. Rather, the change in logic state of the output from comparator 98 provides a logic "1" signal to NAND gate 118, thus enabling that circuit.

Comparator 128 acts as a differential amplifier, whose output $V_0$ can be determined as follows:

$$V_0=0 AK_1V_LGW-K_7V_L, \quad (15)$$

where A = a scaling factor introduced by potentiometer 130, resistors 132 and 134, and $K_7$ = a scaling factor introduced by potentiometer 124 and resistor 126.

The output transition of comparator 114 occurs when the value of the signal applied to its negative input through resistor 126 exceeds the value of the signal applied to its positive input through resistor 112. This transition occurs when $$A_1K_1V_LGW-K_7V_L=V_LGW(CG). \quad (16)$$

Rewriting equation 16, it follows that $$CG=AK_1-(K_7)/(GW \quad (17)$$

By comparison of equations (17) and (8), it can be seen that if $AK_1=L_2$, and $K_7=F_TL_3$, the apparatus approximates the forward CG limit from point $c$ to point $d$.

The output of comparator 114, which is clamped by diodes 120 and 122, is supplied to one input of NAND gate 118 as a logic "1." As the other input of NAND gate 118 also has a logic "1" thereto, a logic "0" output is provided to NAND gate 138 to energize indicator lamp 47.

The circuitry in FIG. 6 can be implemented by well-known solid state components whose accuracy and precision can be controlled within well-defined limits.

Certain types of aircraft have a considerable shift in the center of gravity CG in a forward direction due to burnoff of fuel during flight. Because of this shift, the forward CG limit at high gross weights must be restricted up to a value of 5 percent MAC. Accordingly, the center of gravity limits and actual value may be computed by assuming that the fuel tanks are empty.

Figure 3:
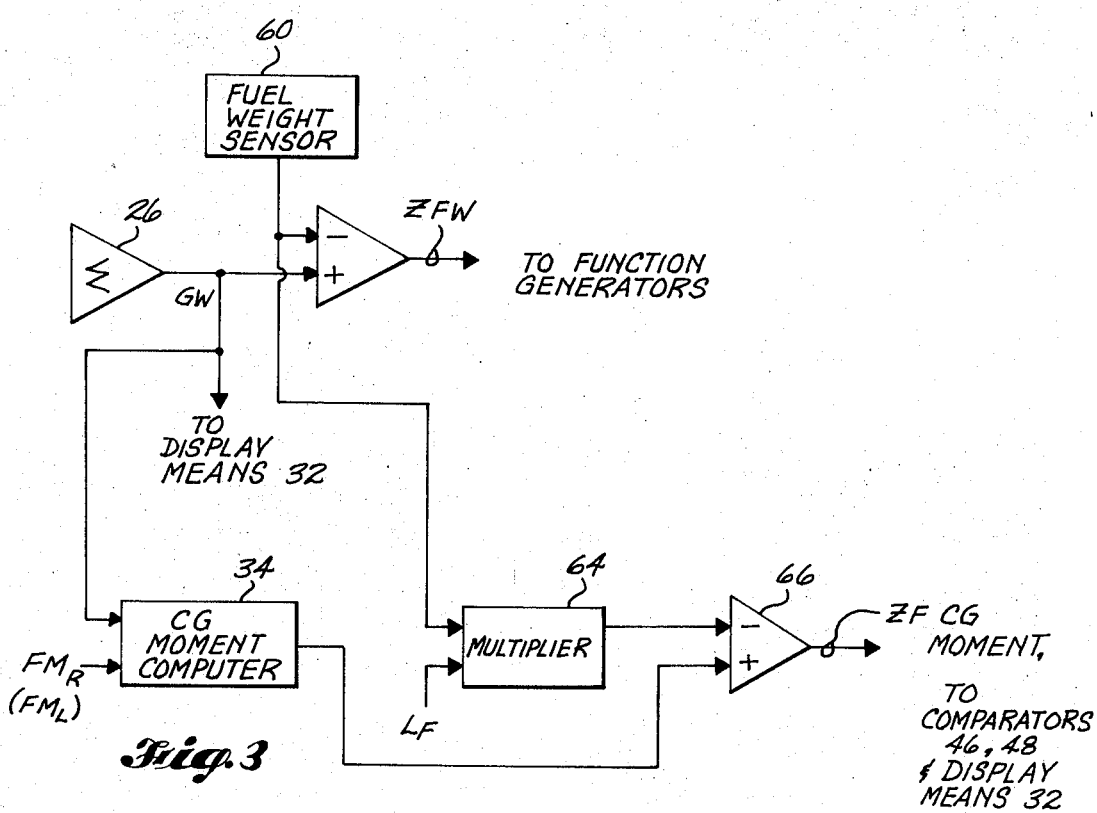
FIG. 3 illustrates a modification to the invention to compensate for fuel weight and moment.

With particular reference to FIG. 3, a fuel weight sensor 60 provides an output signal proportional to the instantaneous gross weight of the fuel. This output signal is fed to one input of operational amplifier 62 connected in a subtracting mode, whose other input is supplied with the GW signal from summing operational amplifier 26. The output of amplifier 62 represents the instantaneous gross weight of the airplane less the instantaneous gross weight of the fuel, and is supplied as signal ZFW to the function generators 28 and 30 so as to appropriately modify the forward and aft CG moment limits for zero fuel conditions.

In addition, the output signal from fuel weight sensor 60 is applied to a multiplier 64 whose other input is supplied with a signal whose value is proportional to the distance $L_F$ between the effective line of action of the fuel weight and the CG reference, or 0 percent MAC. In practice, there will be a plurality of multipliers 64 and fuel weight sensors 60, one being provided for each fuel tank of the aircraft. The output of multiplier 64 represents the CG moment due to the fuel and is coupled to one input of an operational amplifier 66 which is connected in a subtracting mode. The other input to operational amplifier 66 is provided by the CG MOMENT signal from computer 34. The output signal from amplifier 66, representing the zero fuel CG moment, or ZF CG moment, is fed to comparators 46 and 48 and to display means 32. In this manner, the effects of fuel withdrawal upon the CG moment and moment limit calculations is eliminated. Display means 32 may include conventional circuitry to display zero fuel CG, zero fuel weight, gross weight, and CG.

While the invention has been described with respect to a preferred embodiment thereof, it is to be clearly understood by those skilled in the art that the invention is not limited thereto, but rather is intended to be bounded only by the limits of the appended claims.

We claim:

1. An apparatus for indicating when the center of gravity of an aircraft whose landing gear are in ground contact has shifted past acceptable limits thereof with respect to a fixed reference, comprising:
   a. a plurality of transducer means, each of said transducer means being disposed to provide an output signal proportional to the force exerted on one landing gear of the aircraft,
   b. means summing said output signals from said plurality of transducer means to obtain a signal proportional to the aircraft's gross weight,
   c. means computing from said output signals a signal proportional to the aircraft's center of gravity moment with respect to said fixed reference,
   d. means deriving from said gross weight signal first and second signals corresponding to desired forward and aft limits of said center of gravity moment with respect to said fixed reference, and
   e. means providing an alarm indication whenever said center of gravity moment signal exceeds either said first signal or said second signal.

2. An apparatus as recited in claim 1, further including a display means comprising means for computing the aircraft's instantaneous center of gravity from said center of gravity moment and said gross weight signals, and a display device for providing a visual indication of either said instantaneous center of gravity or said instantaneous gross weight.

3. Apparatus as recited in claim 1, wherein said computing means comprises:
   a. means multiplying each of said output signals by a factor proportional to the distance of the corresponding landing gear from said fixed reference, and
   b. means summing said multiplied signals to obtain said center of gravity moment signal.

4. An apparatus as recited in claim 3, wherein said gross weight signal is supplied to said multiplying means in place of one of said transducer output signals.

5. An apparatus as recited in claim 3, wherein said computing means further includes attitude sensing means providing a signal proportional to the tilting deviation of said aircraft from a predetermined position, and means connecting said signal to said summing means along with said multiplied signals.

6. A system for determining whether or not an aircraft has been safely loaded, comprising:
   a. sensor means providing a plurality of signals, each signal being proportional to the force exerted on a landing gear of the aircraft,
   b. means computing the aircraft's actual center of gravity from said plurality of signals,
   c. means computing the aircraft's gross weight from said plurality of signals,
   d. means comparing said actual center of gravity with a predetermined envelope of desired values thereof and providing an output signal when said actual center of gravity does not correspond to said envelope, said comparing means including means generating signals corresponding to forward and aft limits of said desired center of gravity envelope, said generating means including a first function generator providing an aft center of gravity limit corresponding to a predetermined threshold value thereof, and a second function generator deriving from said aircraft's gross weight a forward center of gravity limit.

7. A system as recited in claim 6, wherein said sensor means comprises a plurality of transducer means, each transducer means being responsive to the shear deflection force exerted on one landing gear of the aircraft.

8. A system as recited in claim 6, wherein said second function generator derives said forward center of gravity limit $L_{cg}$ according to the relation $L_{cg} = L_2 - F_T L_3 / GW$.

* * * * *